Patented Nov. 18, 1941

2,262,745

UNITED STATES PATENT OFFICE 2,262,745

TREATMENT OF WATER FOR THE REMOVAL OF FLUORINE

Howard Adler, Flossmoor, Ill., assignor to Victor Chemical Works, a corporation of Illinois No Drawing. Application October 30, 1936, Serial No. 108,496

1 Claim. (Cl. 210—2)

This invention relates to a method of treating water, particularly drinking water, for the removal of fluorine therefrom.

There has been a large number of suggestions for the removal of fluorine from water by the use of various materials, but in general these require either a change in the pH value of the water, or do not sufficiently remove the fluorine.

It has now been discovered that the precipitation of large amounts of tricalcium phosphate in fluorine-bearing water, or the contacting passage of such water with already precipitated tricalcium phosphate will efficiently remove fluorine down to as low as one part per million or less.

In order to remove the fluorine efficiently, the tricalcium phosphate under ordinary precipitating conditions must be present in a concentration at least equal to 200 parts per part of fluorine to be removed. The precipitation of tricalcium phosphate in the water appears to be substantially more effective than the addition of already precipitated material to the water, or the passage of the water through a bed of tricalcium phosphate.

The following are examples of the process carried out under conditions where the chemical efficiency of the process could readily be checked to show accurately the actual chemical analyses and to provide more accurate control of all of the factors.

As an example of the invention, 40 grams of regular commercial grade tricalcium phosphate were placed in a tower having a cross section of 0.3 sq. inch to provide a filter bed about 14.5 inches in height. 3000 cc. of water containing 30 p. p. m. of fluorine in the form of sodium fluoride were percolated through the bed at the rate of 12.5 cc. per minute. The fluorine content of the water was reduced to 0.3 p. p. m. The pH value of the water was 6.3. The phosphate used was equivalent to approximately 450 parts of tricalcium phosphate to one part of fluorine removed.

On the other hand, a sample of Chicago Heights water was diluted with distilled water to give a concentration of approximately 300 p. p. m. of calcium hardness. Sufficient sodium fluoride was added to give a fluorine content of 11.4 P. P. M. The water was then softened by the addition of trisodium phosphate, with resultant precipitation of tricalcium phosphate. The fluorine content of the water was found to be 10.2 p. p. m., showing no substantial change in the fluorine content.

The softened water from the previous example was then treated with 0.5% of commercial grade tricalcium phosphate and thoroughly agitated. The fluorine content of the water was reduced by this treatment to 0.8 p. p. m.

Instead of adding the tricalcium phosphate in that form, the process may readily be carried out by the production of tricalcium phosphate in the water, providing that sufficient lime is made available to produce the large excess of tricalcium phosphate required. For example, 500 cc. of water containing 30 p. p. m. of fluorine was treated with sufficient milk of lime to give a water containing the equivalent of 6000 p. p. m. of hardness (calculated as $CaCO_3$). The water was then softened by the addition of dilute phosphoric acid to cause precipitation of tricalcium phosphate. The precipitate was filtered off, yielding water containing only 0.2 p. p. m. of fluorine and 60 p. p. m. of hardness. The water had a pH value of 7.01.

By controlling the pH value, the hardness may likewise be reduced. For example, at 7.31 pH, the hardness in a similar case was reduced to only 6 p. p. m. and at pH's of 8 or above substantially complete softening may be obtained. Inasmuch as most fluorine containing natural waters are alkaline with pH's of 7.5 to 8.5, the process of this example may be used not only to remove fluorine, but to soften to the required amount.

Under certain conditions, an activated tricalcium phosphate may be produced. The product is normally made by reacting 6 to 8° Baumé lime with 15° Baumé phosphoric acid. If instead of these solutions a considerably more dilute slurry of milk of lime, for example a 1° Baumé slurry, is neutralized with a more dilute phosphoric acid, for example, a 6° Baumé acid, the resulting precipitated tricalcium phosphate has a more gelatinous appearance and is considerably more active. Tricalcium phosphate made in this manner had a fluorine adsorption capacity about one-third greater than regular grade tricalcium phosphate.

For example, a tower filter bed was made up with a more gelatinous tricalcium phosphate which had been dried 48 hours in a steam oven. Particles of 30 to 80 mesh were used. Water containing 30 p. p. m. of fluorine was passed over the bed and it was found that one pound of tricalcium phosphate would adsorb 2.02 grams of fluorine in the production of water with less than 1 p. p. m. of fluorine. This is equivalent to 225 parts of tricalcium phosphate to 1 part of fluorine removed.

In cases were water is percolated through a bed of tricalcium phosphate, the spent phosphate may be regenerated by washing it with a dilute caustic soda solution. In household use, however, it is generally preferable to discard the spent material.

Trimagnesium phosphate may be substituted for tricalcium phosphate, but it is more expensive and has a somewhat lower efficiency than the tricalcium phosphate.

The foregoing detailed description has been given for clearness of understanding only and no unnecessary limitations should be understood therefrom, but the appended claim should be construed as broadly as permissible in view of the prior art.

I claim:

A method for the removal from drinking water of fluorides dissolved in the water consisting in contacting such fluoride containing drinking water with trimagnesium phosphate in an amount of at least 200 parts per one part of fluoride contained in said water, maintaining contact between the trimagnesium phosphate and the water for a period sufficient to reduce the fluoride content to a negligible amount, and separating the water from the magnesium phosphate and other insoluble solids in the water.

HOWARD ADLER.